Sept. 26, 1967　　　　　N. L. MILLER　　　　　3,343,421
METHOD AND APPARATUS FOR EXTRACTING SOIL GAS SAMPLES
Filed Jan. 15, 1965　　　　　　　　　　　　2 Sheets-Sheet 2
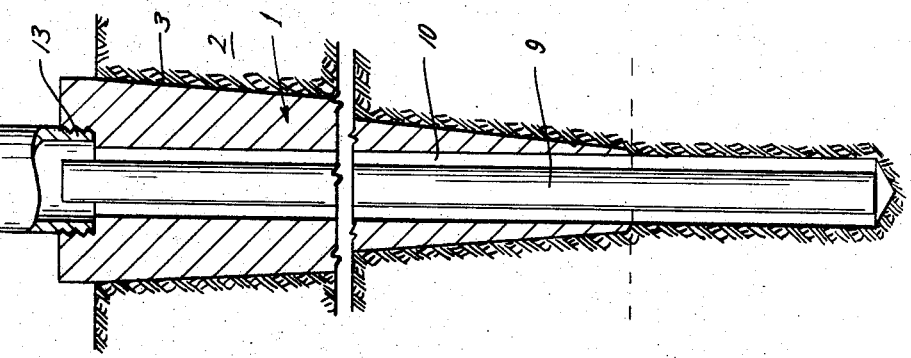
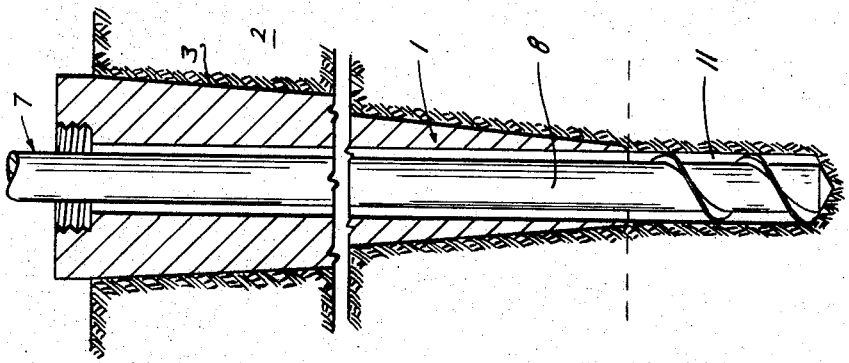
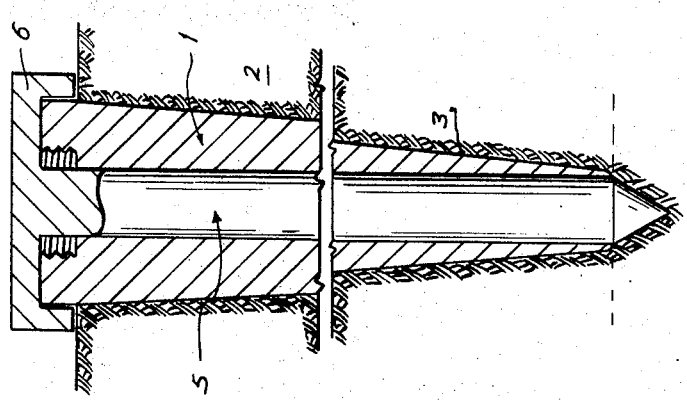
Norvel L. Miller
INVENTOR.
BY
Arnold and Roylance
ATTORNEYS United States Patent Office 3,343,421
Patented Sept. 26, 1967

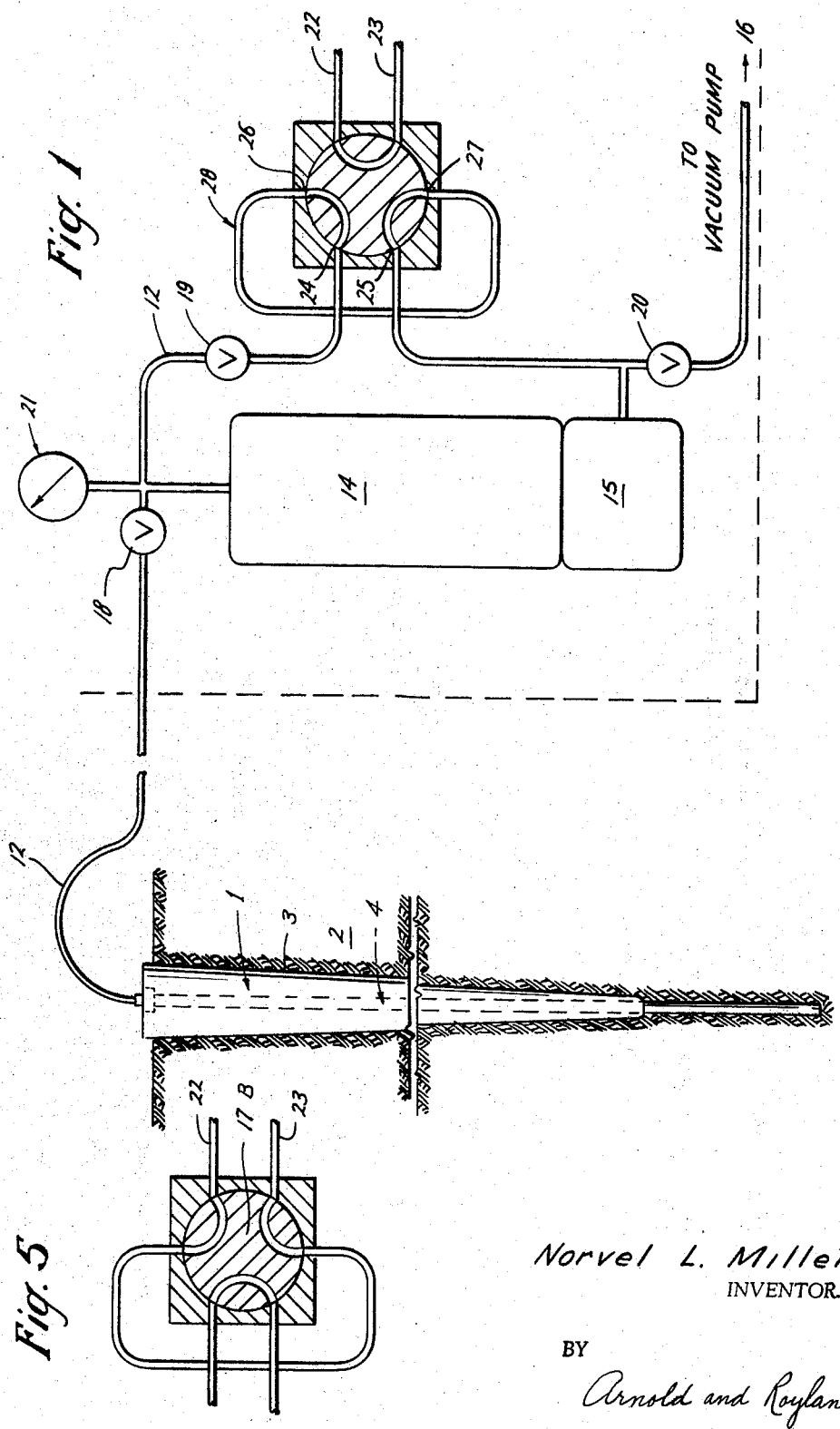

3,343,421
METHOD AND APPARATUS FOR EXTRACTING SOIL GAS SAMPLES
Norvel L. Miller, 3827 Childress, Houston, Tex. 77005
Filed Jan. 15, 1965, Ser. No. 425,879
10 Claims. (Cl. 73—421.5)

ABSTRACT OF THE DISCLOSURE

Soil-gas testing apparatus and method using tapered probe having longitudinal bore therethrough, removable plug for fitting in the bore, auger for drilling a hole beneath the bore, and displacing rod for fitting into the bore and hole. Two chambers for receiving soil gas, connectable through a sampling valve in fluid communication or fluid isolation, and a six-way sampling valve.

---

This invention relates to the extraction of gas samples from the soil. More particularly this invention relates to a method and apparatus for removing soil gas samples from the earth, whereby such samples are relatively uncontaminated by air and other gases which are not contained in the sample tested. Thus, by using the present invention, it is possible to obtain a sample which is truly representative of the soil in the area tested.

For several reasons it is often desirable to test the composition of the gas in the earth's surface at a particular point both qualitatively and quantitatively. Probably most often the reason for such testing is the desire to ascertain whether a given area has mineral deposits, for instance oil or natural gas. An accurate determination of the composition of the soil gas in a given area is an invaluable aid in helping those skilled in the art to locate valuable mineral deposits.

Although methods and apparatus for extracting such soil gas samples are known, they are generally unsatisfactory. The principal difficulty has been the contamination of the samples with air or other gases. Air contaminates a soil gas sample in the sense that it so dilutes a sample that it becomes impossible, or almost so, to get a dependable result which is capable of any precision in reproduction. That is, when successive samples are taken, it is noted that the results vary widely, even though the samples are being taken from the same exact location. There is also a problem with other gases or vapors in the atmosphere or at the earth's surface which tend to mingle with the soil gas sample before it can be isolated, thus rendering the results of the gas analysis non-representative of the actual sample taken. The present invention overcomes these difficulties by providing a simple and economical method whereby a sample may be taken which is uncontaminated by other gases, and hence analyses may be obtained which are truly representative of the sample taken.

Using one very useful embodiment of this invention, it is possible to collect the samples in substantially equal volumes, thus resulting not only in efficient design of the testing apparatus, but also leading to a high degree of reproducibility in the results.

An object of this invention is to provide a method of securing a soil gas sample which is relatively uncontaminated by the air or other atmospheric or surface gases.

Another object of this invention is to provide apparatus useful in obtaining such samples.

Another object of this invention is to provide a method of obtaining soil gas samples in substantially equal volumes.

Yet another object is to provide apparatus whereby soil gas samples may be collected in substantially equal volumes.

In order that the manner in which the foregoing and other objects are attained in accordance with the invention can be understood in detail, one advantageous embodiment of the invention will be described with reference to the accompanying drawings, which form a part of this specification, and wherein:

FIGURE 1 is a schematic view, partly elevational and partly in section, illustrating one embodiment of the soil gas extraction apparatus of the present invention connected to a preferred embodiment of the apparatus for collecting the extracted gas samples.

FIGURE 2 is an elevational view, partly in section, showing the extraction apparatus of FIGURE 1 just after it has been inserted into the soil.

FIGURE 3 is also an elevational view of this same apparatus, but at a subsequent step in the method of this invention.

FIGURE 4 is also an elevational view, partly in section, at a still subsequent step in the method of this invention.

FIGURE 5 is a schematic view of the sample valve shown in FIGURE 1, with the valve turned in such a position that the gas sample may be removed from the valve.

Referring now to FIGURE 1 in greater detail, a tapered extraction probe 1 is shown inserted into the surrounding soil 2. It is noted that the soil is compacted in the area 3 adjacent the surface of the probe.

The probe 1 may be of any suitable shape just so long as it is tapered in order to facilitate its insertion into the soil. Examples of useful tapered bodies are frustums of cones and pyramids, i.e., sections of cones and pyramids having a large base [or simply "base"] and a small base [or "smaller end"]. Particularly advantageous are frustums of right circular cones. The probe may be of any suitable material which is relatively hard, but is preferably of steel or other metal. The dimensions of the probe are not critical, but it is advantageous to have the length considerably greater than the diameter. Thus, if the probe is in the shape of a conical frustum, a particularly advantageous embodiment might have a diameter of 3 to 4 inches at the base, a diameter of about 1 inch at the smaller end, and a length (or altitude) of 3 to 4 feet.

As seen in FIGURE 2, the probe 1 is generally solid except for a longitudinal bore 4. This bore is usually parallel to the longitudinal axis of the frustum and concentric therewith. In some situations, however, it is desired that the bore be at an angle with the axis, or parallel with the axis but removed to one side or the other of the altitude of the probe, which extends from the center of the base of the probe to the vortex or apex thereof. The bore may be approximately the same in diameter as the small base of the tapered probe, for instance about 1 inch.

In order that the soil will be displaced and compacted around the lower end of the bore when the probe is inserted in the soil, the bore must be occupied by a plug 5 at the time of insertion. This plug takes the form of a cylindrical rod which is essentially the same in diameter as the diameter of the bore; thus the rod fits snugly into the bore. The rod or plug 5 is adapted for removable insertion into the bore; this is conveniently done by making the plug integral with a cap 6 which fits onto the top of the large base of the probe. Thus, when the plug is integral with and dependent from the cap, it is readily and easily removed simply by removing the cap.

Referring now to FIGURE 3, the auger 7 is shown having a shank 8. The length of the shank, or the auger, is longer than the length of the bore, in order that a hole 11 may be drilled in the soil immediately beneath the bore 4.

The auger 7 should be of such a size that the hole 11 may have a diameter approximately the same as the diameter of the bore 4.

Once the hole 11 has been drilled by the auger, the auger is removed from the bore, and a displacing rod 9 is inserted into the bore of the probe, as shown in FIGURE 4. The purpose of this displacing rod is to occupy as much as possible of the open space in the bore 4 and its extension, the hole 11. Thus, the diameter of the displacing rod is, again, approximately equal, but slightly less, than the diameter of the bore 4 and hole 11. When the displacing rod is inserted into the bore, a small annular space 10 is left between the rod and the bore and hole.

A conduit 12 is shown connected to the bore 4 at the base, by the threads 13. Any suitable manner of connecting the conduit to the bore within the method of this invention, the threaded engagement being shown merely as illustrative of one example of how this connection may be made. With the displacing rod 9 in the bore and hole, the conduit effects fluid communication between the annular space 10 and collecting and testing apparatus.

In the embodiment of FIGURE 1, conduit 12 is illustrated as one conduit throughout the entire apparatus. It is understood, however, that any number of conduits may be used as long as they are interconnectable one with the other.

One embodiment of collecting and testing apparatus according to this invention which is particularly advantageous is shown in FIGURE 1. By using the apparatus of this embodiment, soil gas samples of approximately equal volume may be collected.

The apparatus consists essentially of two vacuum chambers, a sample valve of particular utility, and flow control means.

A first vacuum chamber 14 is illustrated in FIGURE 1 located on conduit 12 downstream from the extracting apparatus. First vacuum chamber 14 is in fluid communication with a second vacuum chamber 15, connectable to a source of vacuum 16 (not shown), such as a vacuum pump. A sample valve 17 of particular utility is located in conduit 12 intermediate the first and second vacuum chambers.

The sample valve shown in FIGURES 1 and 5 is especially advantageous. In position "A," as shown in FIGURE 1, gas enters the valve from the first vacuum chamber at 24, leaves the valve at 26 to flow through loop 28 in conduit 12, re-enters the valve at 27, and then leaves the valve at 25 to flow to the second vacuum chamber. When a sample is to be taken, the valve is turned to position "B," as shown in FIGURE 5, by turning the valve one-sixth revolution to either right or left. In this position, the sample is connectable to carrier gas inlet 22 and carrier gas outlet 23, whereby the sample may be removed.

Flow control means, such as valve 18, is located in conduit 12 between the extracting apparatus and the first vacuum chamber, enabling this chamber to be at times in fluid communication and at times in fluid isolation with the extracting apparatus.

Second flow control means, such as valve 19, is located in conduit 12 between the first vacuum chamber and the second vacuum chamber. The valve is shown in FIGURE 1 to be located on the upstream side of the sample valve 17; this is not critical, however, just so it is somewhere between the two vacuum chambers so that the two chambers may at times be in fluid communication and at other times in fluid isolation.

Third flow control means, such as valve 20, is located in conduit 12 between the second vacuum chamber and the vacuum pump or other source of vacuum 16. This allows the second vacuum chamber to be in fluid communication, at times, and in fluid isolation, at other times, with the source of vacuum.

It is usually convenient to insert a flow regulating device upstream from flow control means 18.

Having now described the apparatus in detail, one example of the method of the invention will be summarized.

An area of soil to be tested is selected. The tapered probe 1, having its longitudinal bore 4 plugged by a rod 5 depending from a cap 6, is inserted in the soil in the area to be tested, thereby compacting the soil in the area adjacent the surface of the probe. After the probe has been inserted to the desired depth, the cap 6 is removed, thereby unplugging the bore 4 and leaving the bore unoccupied. The auger 7 is then inserted into the bore and hole 11 is drilled into the soil immediately below the lower end of the bore. The auger is then removed from the bore, and displacing rod 9 is inserted into the bore. With the displacing rod then into place, conduit 12 is secured to the bore at its exposed end, the conduit being connected downstream to collecting and testing apparatus.

In an especially useful embodiment for collecting the samples in equal volumes, the conduit is secured downstream to the apparatus described above.

Both vacuum chambers are evacuated, as is that portion of conduit 12 between valve 18 and the source of vacuum, by opening valves 19 and 20 and closing valve 18, and drawing a vacuum from 16. Valve 19 is then closed and valve 18 opened, whereby the soil gas sample flows from the soil through the bore 4 and conduit 12 into the first vacuum chamber 14 until the pressure in the first vacuum chamber, as read from the gauge 21 reaches any desired pressure, for example atmospheric. [Of course the pressure may not be greater than the pressure in the soil.] The sample valve is placed in position "A." Valve 18 is then closed, as is valve 20, and valve 19 is opened; and gas is allowed to flow between the two vacuum chambers until the pressure in the two chambers is equalized, as determined by no further decrease in pressure at the gauge 21. The sample valve is then placed in position "B" and the sample of soil gas is then removed by means of a carrier gas. The carrier gas is drawn into the sample loop through inlet tube 22, and the gas sample and carrier gas leave through outlet 23 to analysis equipment. When this process is repeated, it will be seen that substantially equal volumes will be collected; and, when samples are taken from the same area of soil, excellent reproducibility will be obtained.

I claim:

1. A method of extracting and collecting approximately equal volumes of uniformly high purity soil gas samples from soil comprising, inserting into the soil, smaller end first, a tapered extraction probe having a plugged bore therethrough, whereby the soil immediately around said probe is compacted at least somewhat and whereby one end of said bore is positioned in said compacted soil a predetermined distance from the surface thereof, removing said plug from said bore and drilling through said bore to effect a hole in the soil, inserting into said bore and hole a displacing rod adapted to displace as much gas as can feasibly be displaced while still affording fluid flow along the hole and bore, evacuating each of two vacuum chambers to be approximately free of contaminating fluids, connecting the first of said chambers into fluid communication with said bore thereby to withdraw into said chamber a sample of soil gas, isolating said first chamber from said bore and connecting it through a soil sampling valve into fluid communication with said second chamber until the pressure in the two chambers equalize one with the other, and collecting the soil gas sample to be tested from said sample valve.

2. Apparatus for extracting and collecting approximately equal volumes of uniformly high purity soil gas samples from soil comprising, a probe of generally conical form having a bore therethrough and having a smaller end and a base and adapted to be inserted into soil with the smaller end thereof extending into the soil;

a removable cap adapted to fit onto said base;

an elongated member integral with said cap and dependent therefrom and adapted for removable insertion into said bore;

an auger having a length greater than the length of said bore and adapted upon removal of said elongated member for drilling a hole of diameter approximately equal to that of said bore and extending therefrom;

a cylindrical displacer rod having a diameter slightly less than the diameter of said bore and said hole and of a length approximately equal to the combined length of said bore and said hole, and adapted for insertion thereinto upon the removal of said auger;

a first and a second vacuum chamber, said chambers being jointly connectable into fluid communication with and alternatively connectable into fluid isolation from said bore, said chambers being also jointly connectable into fluid communication with and into fluid isolation from a source of vacuum, said chambers being connectable one to the other through a gas sampling valve, said gas sampling valve being also connectable into fluid communication with and into fluid isolation from a source of carrier gas, whereby said sample may be removed from said sample valve.

3. A method of extracting soil gas samples from the soil comprising:

inserting into the area of the soil to be tested, smaller end first, a tapered probe, said probe being characterized by a plugged longitudinal bore therein, thereby compacting the soil in the area adjacent the surface of the probe, removing the plug from said bore, drilling through said bore to effect a hole in the soil adjacent the lower end of said bore, inserting into said bore and hole a displacing rod adapted to displace as much gas as can feasibly be displaced while still affording fluid flow along the hole and bore, and removing the soil gas sample to be tested.

4. A method of extracting soil gas samples from the soil comprising:

inserting into the area of the soil to be tested, smaller end first, a tapered probe having a plugged longitudinal bore therein, whereby the soil in the area adjacent the surface of the probe is compacted at least somewhat, removing the plug from said bore and drilling through said bore to effect a hole in the soil adjacent the lower end of said bore, inserting into said bore and hole a displacing rod adapted to displace as much gas as can feasibly be displaced while still affording fluid flow along said hole and bore, securing a conduit to said bore at the exposed end thereof, and removing the soil gas sample to be tested through said conduit.

5. The method of claim 4 wherein said tapered probe is in the form of a frustum of a right circular cone.

6. The method according to claim 4 wherein the diameter of the base of said probe is approximately 3 to 4 inches, the diameter of the smaller end of said probe is approximately 1 inch, and the diameter of said bore is approximately 1 inch.

7. Apparatus for extracting gas samples from the soil comprising:

a tapered probe having a bore therethrough and adapted to be inserted into the soil with the smaller end thereof extending into the soil;

a removable cap adapted to fit onto said base;

an elongated member integral with said cap and dependent therefrom, and adapted for removable insertion into said bore;

an auger having a length greater than the length of said bore and adapted upon removal of said elongated member for drilling a hole of diameter approximately equal to that of said bore and extending therefrom; and a cylindrical displacer rod having a diameter slightly less than the diameter of said bore and said hole and of a length approximately equal to the combined length of said bore and said hole, and adapted for insertion thereinto upon the removal of said auger.

8. Apparatus for extracting gas samples from the soil comprising:

a tapered probe of generally conical form having a longitudinal bore therethrough and adapted to be inserted into the soil with the smaller end thereof extending into the soil;

a removable cap adapted to fit onto said base;

an elongated member integral with said cap and dependent therefrom, and adapted for removable insertion into said bore;

an auger having a length greater than the length of said bore and adapted upon removal of said elongated member for drilling a hole of diameter approximately equal to that of said bore and extending therefrom;

a cylindrical displacer rod having a diameter slightly less than the diameter of said bore and said hole and of a length approximately equal to the combined length of said bore and said hole, and adapted for insertion thereinto upon removal of said auger; and a conduit adapted to be secured to said bore at its exposed end whereby said gas sample may be removed from the soil.

9. Apparatus according to claim 8 wherein said tapered probe is in the form of a frustum of a right circular cone.

10. The apparatus according to claim 8 wherein the diameter of the base of said probe is approximately 3 to 4 inches, the diameter of the smaller end of said probe is approximately 1 inch, and the diameter of said bore is approximately 1 inch.

References Cited

UNITED STATES PATENTS

| 2,141,261 | 12/1938 | Clark | 73—421.5 |
| 2,479,787 | 8/1949 | Stevens | 73—421.5 |
| 2,545,900 | 3/1951 | Squires | 73—421.5 |
| 3,032,953 | 5/1962 | Micheletti | 73—23.1 X |

FOREIGN PATENTS

| 76,994 | 1/1954 | Denmark. |
| 634,680 | 9/1936 | Germany. |

LOUIS R. PRINCE, *Primary Examiner.*

S. C. SWISHER, *Examiner.*